US008202082B2

(12) United States Patent
Catoen

(10) Patent No.: US 8,202,082 B2
(45) Date of Patent: *Jun. 19, 2012

(54) INJECTION MOLDING APPARATUS HAVING AN EDGE-GATED RUNNERLESS NOZZLE INCLUDING A BRACING COMPONENT AND A SECURING COMPONENT

(75) Inventor: Bruce Catoen, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/157,333

(22) Filed: Jun. 10, 2011

(65) Prior Publication Data

US 2011/0240687 A1    Oct. 6, 2011

Related U.S. Application Data

(62) Division of application No. 12/775,200, filed on May 6, 2010, which is a division of application No. 12/111,938, filed on Apr. 29, 2008, now Pat. No. 7,794,228.

(51) Int. Cl.
B29C 45/22    (2006.01)
(52) U.S. Cl. ....................................... 425/572
(58) Field of Classification Search .................. 425/549, 425/570, 572; 264/328.15
See application file for complete search history.

(56) References Cited

U.S. PATENT DOCUMENTS

| | | | |
|---|---|---|---|
| 4,345,892 A | 8/1982 | Schulte et al. | |
| 5,208,052 A | 5/1993 | Schmidt et al. | |
| 5,288,451 A | 2/1994 | Schad | |
| 5,324,191 A | 6/1994 | Schmidt | |
| 5,474,439 A | 12/1995 | McGrevy | |
| 5,494,433 A | 2/1996 | Gellert | |
| 5,536,165 A | 7/1996 | Gellert | |
| 5,591,465 A | 1/1997 | Babin | |
| 5,952,016 A | 9/1999 | Gellert | |
| 6,318,990 B1 | 11/2001 | Gellert et al. | |
| 7,303,384 B2 | 12/2007 | Schreck | |
| 7,547,208 B2 | 6/2009 | Babin et al. | |
| 7,794,228 B2 * | 9/2010 | Catoen ........................ | 425/549 |

(Continued)

FOREIGN PATENT DOCUMENTS

CA    2327759    5/2001

(Continued)

OTHER PUBLICATIONS

"A hot little number with no cold slug: Edge gating that offers nothing but advantages", *Heitec Brochure*, (Apr. 22, 2008).

(Continued)

*Primary Examiner* — Timothy Heitbrink
(74) *Attorney, Agent, or Firm* — Medler Ferro PLLC

(57) ABSTRACT

A nozzle body defines an upstream channel. A downstream bracing portion has a lateral bore. A nozzle tip extends laterally through the lateral bore of the bracing portion and has a sealing surface for engaging a gate component that defines a mold gate. The runnerless nozzle further includes a securing component inserted into the bracing portion to hold the nozzle tip against the bracing portion. The bracing portion or the securing component defines a lateral channel in communication with the upstream channel for delivering molding material to the nozzle tip. The nozzle tip can be removed by removing the securing component.

17 Claims, 12 Drawing Sheets

U.S. PATENT DOCUMENTS

| | | |
|---|---|---|
| 2005/0067510 A1 | 3/2005 | Schreck |
| 2010/0092602 A1 | 4/2010 | Gunther et al. |

FOREIGN PATENT DOCUMENTS

| | | |
|---|---|---|
| CA | 2 110 438 C | 4/2002 |
| CA | 2616401 | 6/2008 |
| DE | 7603206 | 6/1976 |
| DE | 4234326 | 4/1994 |
| EP | 0186413 | 7/1986 |
| EP | 0447573 | 9/1991 |
| EP | 1231041 | 9/2004 |
| JP | 54-076656 | 6/1979 |
| JP | 63-137821 | 6/1988 |
| JP | 2005-132026 | 5/2005 |
| WO | WO-2009124865 | 10/2009 |

OTHER PUBLICATIONS

"Edge Gating Technology From the Technology Leader", *Heitec Brochure* Publication date: Unknown.

"International Search Report and Written Opinion", International Application No. PCT/CA2009/000573, (Jul. 15, 2009).

"Multitip Edge-Gate Nozzles Provide Flexibility, No Processing Problems", *European Tool and Mould Making*, (Oct. 2004).

"Single Star Line, Linear, TYP 01.274", *Heitec Brochure*, (Apr. 3, 2009).

Extended Search Report for EP Application No. 11004791.7, mailing date Sep. 27, 2011.

\* cited by examiner

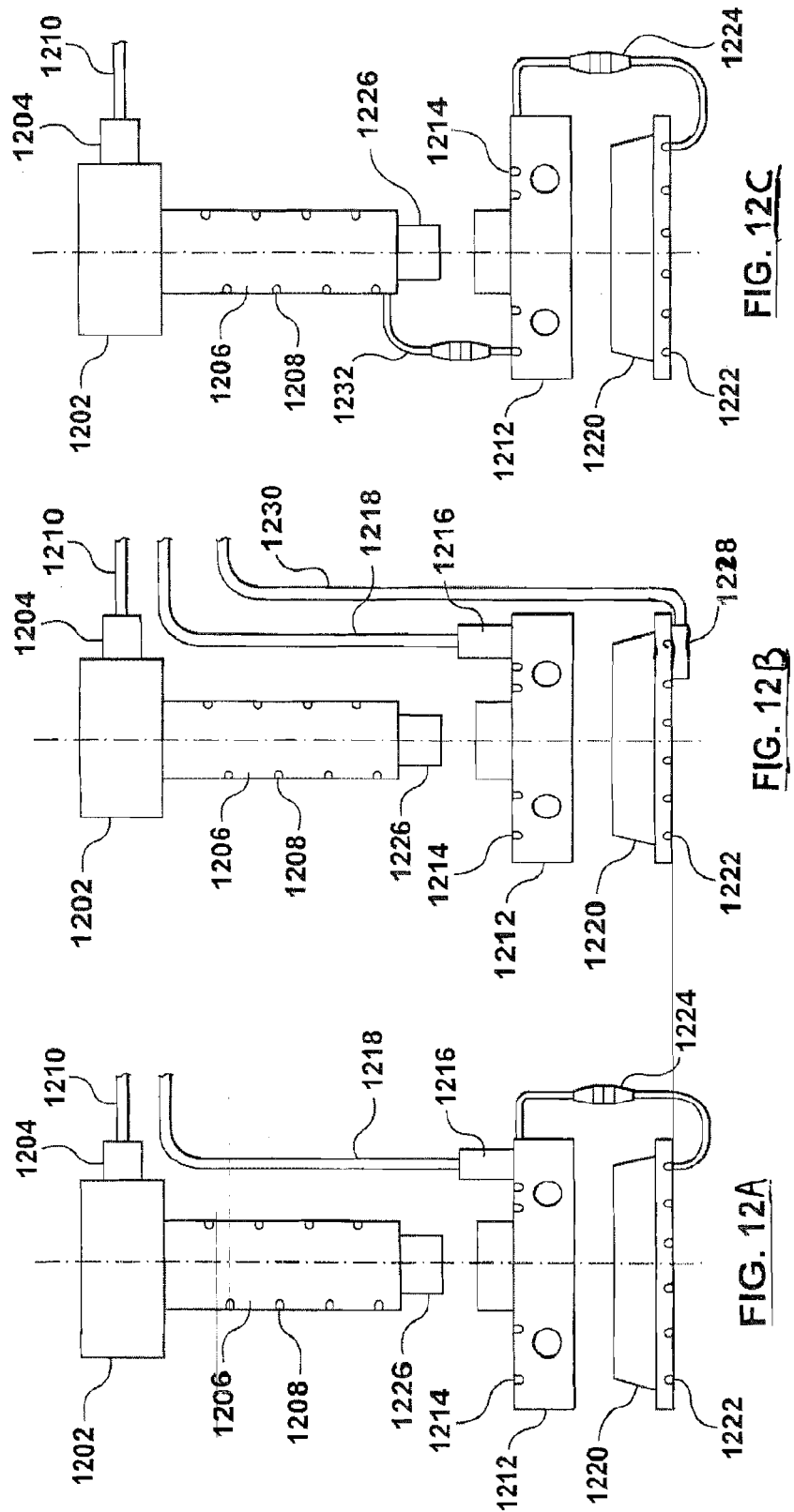

INJECTION MOLDING APPARATUS HAVING AN EDGE-GATED RUNNERLESS NOZZLE INCLUDING A BRACING COMPONENT AND A SECURING COMPONENT

CROSS-REFERENCE TO RELATED APPLICATION

This application is a divisional of U.S. application Ser. No. 12/775,200 filed May 6, 2010, which is a divisional of U.S. application Ser. No. 12/111,938 filed Apr. 29, 2008, now U.S. Pat. No. 7,794,228, the entirety of both applications incorporated by reference herein.

BACKGROUND OF THE INVENTION

1. Field of the Invention

The present invention relates to an injection molding apparatus, and more particularly, to an edge-gated injection molding apparatus.

2. Related Art

In many cases, edge-gated nozzles allow for improved mold cavity location over straight-gated nozzles. Improved cavity location can mean more economical molding operations.

However, edge gating can have problems not normally encountered in straight gating. For example, there are many solutions that simplify nozzle tip replacement in straight gating, and many of these do not require disassembly of the mold. The same cannot be said for edge gating. In addition, individual straight-gated cavities can be taken out of service relatively easily compared to the edge-gated scenario.

Therefore, edge gating requires general improvement to realize some of the inherent benefits of straight gating.

SUMMARY OF THE INVENTION

A runnerless nozzle for an injection molding apparatus has a nozzle body defining an upstream channel, a downstream bracing portion having a lateral bore, and a nozzle tip extending laterally through the lateral bore of the bracing portion. The nozzle tip has a sealing surface for engaging a gate component that defines a mold gate. The runnerless nozzle further includes a securing component inserted into the bracing portion to hold the nozzle tip against the bracing portion. At least one of the bracing portion and the securing component defines a lateral channel in communication with the upstream channel for delivering molding material to the nozzle tip. The nozzle tip can be removed by removing the securing component.

BRIEF DESCRIPTION OF THE FIGURES

Embodiments of the present invention will now be described more fully with reference to the accompanying drawings where like reference numbers indicate similar structure.

FIGS. 12A-12C are schematic diagrams of various heater configurations for nozzles of the embodiments described herein.

DETAILED DESCRIPTION OF THE INVENTION

Figure 1:
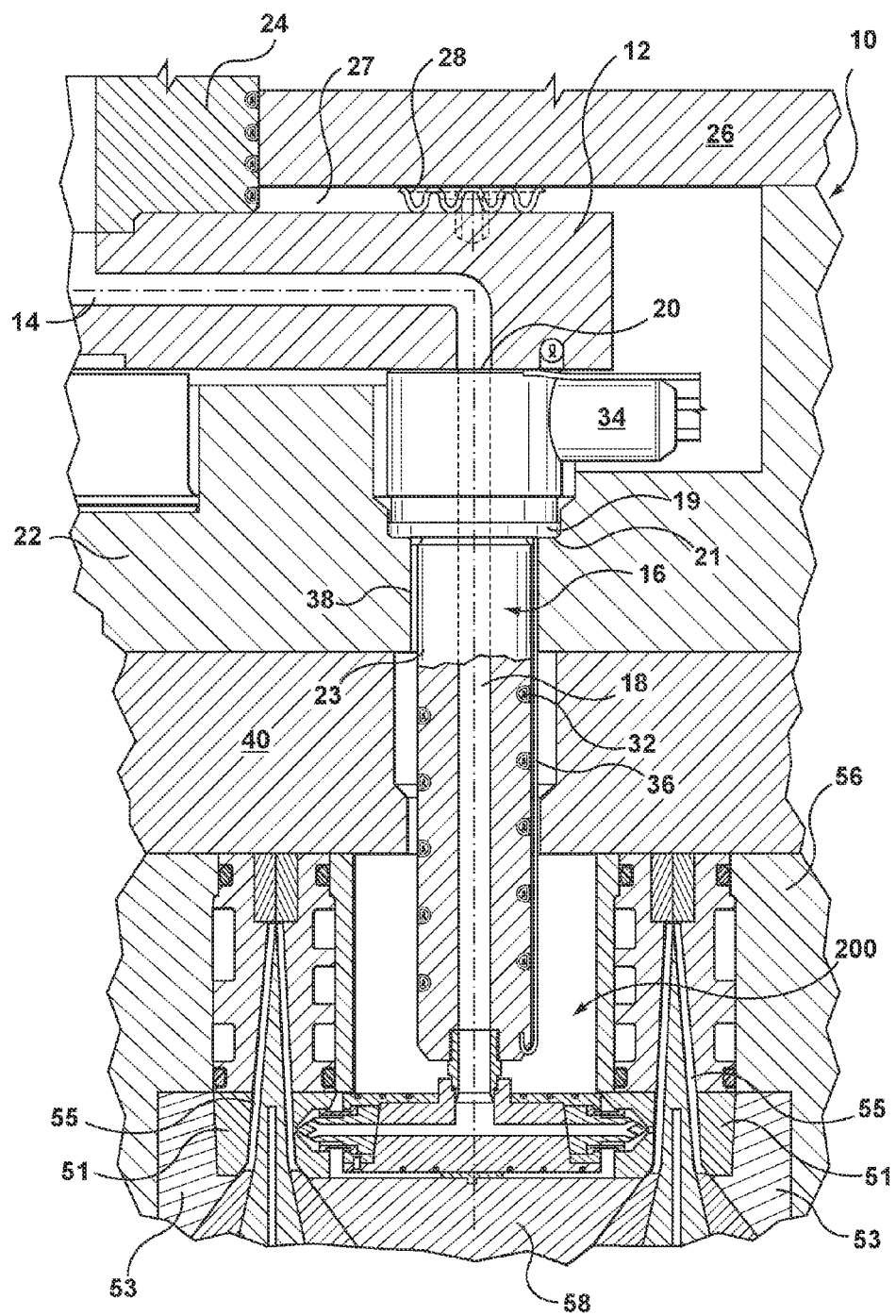
FIG. 1 is a partial cross-sectional view of an edge-gated injection molding apparatus in accordance with an embodiment of the present invention.

An edge-gated injection molding apparatus in accordance with an embodiment of the present invention is illustrated in FIG. 1 and is generally indicated by reference numeral 10. The features and aspects described for the other embodiments can be used accordingly with the present embodiment.

Runnerless nozzles are nozzles where waste in the form of a hardened runner does not occur. In the present application, one form of a runnerless nozzle, a hot-runner nozzle, is described. However, the invention equally applies to other kinds of runnerless nozzles, such as those used for thermosets (e.g., liquid silicone rubber—LSR), where waste in the form of a hardened runner does not occur.

The injection molding apparatus 10 includes a manifold 12 that is located between a mold plate 22, a sprue bushing 24, and a back plate 26. A pressure disk 28 spaces the manifold 12 from the back plate 26 and allows for thermal expansion. The pressure disk 28 also maintains an insulating air space 27 between the manifold 12 and the back plate 26. A machine nozzle (not shown) delivers a stream of molding material under pressure to a manifold channel 14 of the manifold 12 through sprue bushing 24.

One or more runnerless nozzles 16 (one shown) are coupled to the manifold 12. Each nozzle 16 includes a nozzle body having an upstream nozzle portion 23 defining an upstream channel 18 that is aligned with a respective manifold outlet 20 to receive molding material from the manifold channel 14. The nozzle 16 has a flange portion 19 that sits in a corresponding shoulder portion 21 of the mold plate 22.

The upstream nozzle portion 23 of the nozzle 16 extends through an opening 38, which extends through the mold plate 22 and a mold plate 40. A nozzle heater 32 is coupled about the upstream nozzle portion 23 to provide heat thereto. The nozzle heater 32 is in communication with a power source (not shown) through an electrical connector 34 (terminal end). A thermocouple 36 is coupled to the nozzle 16 to provide temperature measurements thereof.

A downstream nozzle portion 200 is connected to the downstream end of the upstream nozzle portion 23. The downstream nozzle portion 200 delivers molding material from the upstream nozzle portion 23 to a mold cavity or cavities 55.

The mold cavities 55 are radially spaced around the downstream nozzle portion 200. Gates to the mold cavities are defined by gate inserts 51 that are retained by a gate insert retainer 53. A cavity plate 58 is provided downstream of the downstream nozzle portion 200. Another plate 56 is provided to support the other components. The configuration of mold cavities 55, gate inserts 51, gate insert retainers 53, and plates 56, 58 can vary widely from design to design.

One or more of the plates 26, 22, 40 can be considered an example of a plate assembly. In other embodiments more or few plates can be used. The injection molding apparatus 10 is generally used as part of a mold. Opening the mold can include withdrawing the mold cores from the mold cavities 55 to allow ejection of the parts formed in the mold cavities 55. Other molds may have other opening operations, which may involve withdrawing plates.

Figure 2:
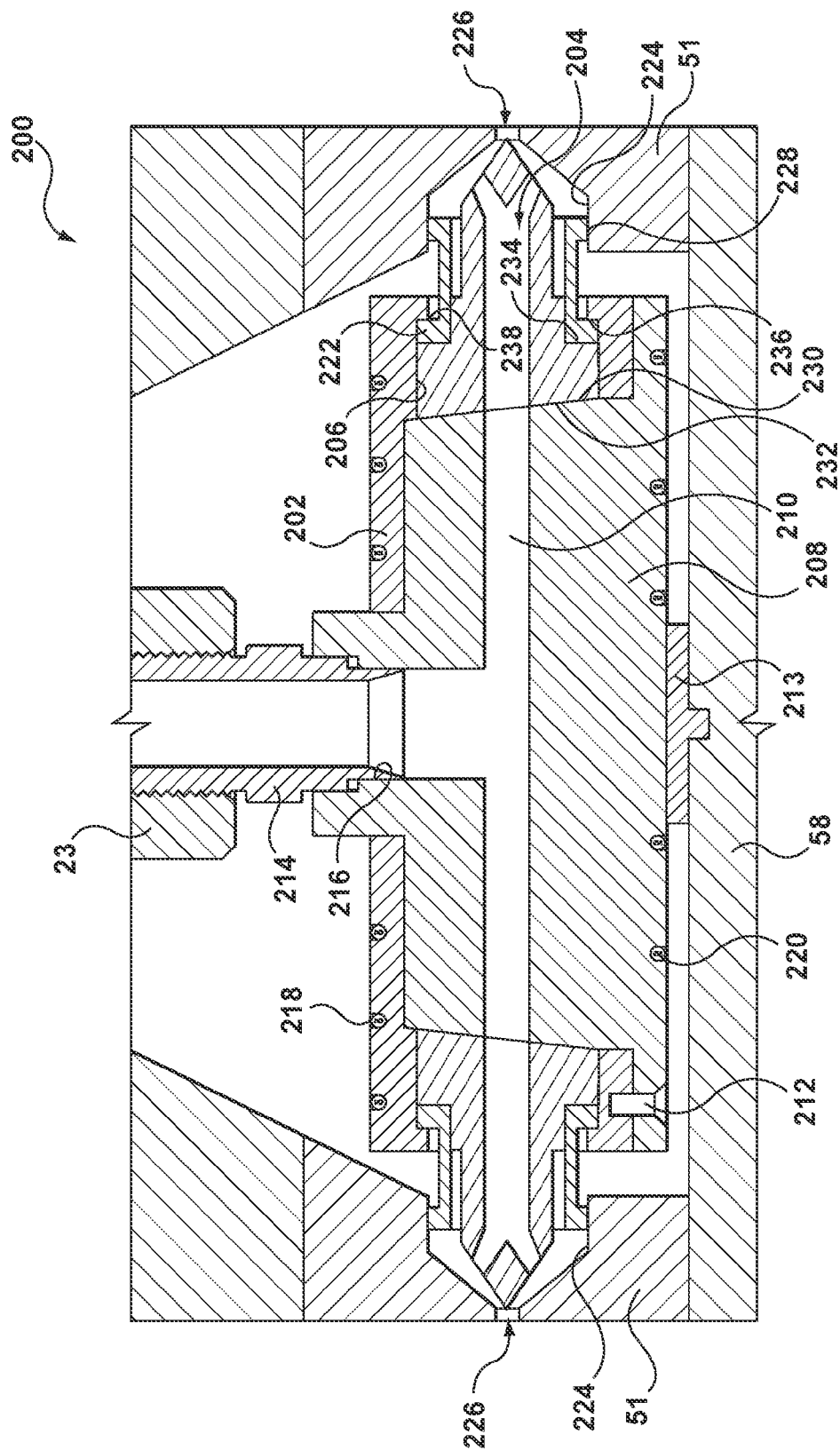
FIG. 2 is a close-up cross-sectional view of the downstream nozzle portion of FIG. 1.

FIG. 2 illustrates a close-up view of the downstream nozzle portion 200.

The downstream nozzle portion 200 includes a bracing portion defined by a bracing component 202, a plurality of nozzle tips 204 extending laterally through a plurality of bores 206 of the bracing component 202, and a securing component 208 inserted into the bracing component 202 to hold the nozzle tips 204 against the bracing component 202. At least one of the bracing component 202 and the securing component 208 defines a plurality of lateral channels 210 in communication with the upstream channel 18 (FIG. 1) for delivering molding material to the nozzle tips 204. In this embodiment, the securing component 208 includes the lateral channels 210.

Any number of nozzle tips 204 can be used, and the specific quantity may depend on the application at hand and the space available. In this embodiment the nozzle tips 204 are evenly radially spaced, but again, this is a design choice. Furthermore, since this is edge gating, the laterally extending nozzle tips 204 and the lateral channels 210 extend outwards from the upstream channel 18. While this lateral extension is shown as perpendicular, the nozzle tips 204 and channels 210 can be disposed at angles other than perpendicular. The term "lateral" herein denotes that the flow of molding material has a lateral component with respect to the upstream channel 18, but need not be entirely lateral.

The bracing component 202 and securing component 208 work in conjunction to hold the nozzle tips 204 in place. The securing component 208 has a plug-like shape and is inserted into the bracing component 202, which has a mating cup-like shape. The securing component 208 is connected to the bracing component 202 by a fastener, such as bolts 212 (one shown). Besides bolts, any other kind of fastener can be used to fix the securing component 208 to the bracing component 202. A locater 213 locates the securing component 208, and thus the whole downstream nozzle portion 200, with respect to the plate 58. The locater 213 can also act as a point of support for downstream nozzle portion 200.

In this embodiment, the securing component 208 is slidably connected to the upstream nozzle portion 23 by way of a nozzle link 214 that threads into the upstream nozzle portion 23 and telescopically slides within an inlet opening 216 of the securing component 208. In another embodiment, the nozzle link 214 can be flipped around such that it is threaded into the securing component 208 and slidably mated with the upstream nozzle portion 23.

The bracing component 202 and the securing component 208 both have heaters 218 and 220, respectively. The heaters 218, 220 are embedded insulated conductive wires. However, other kinds of heaters may be used as well. In another embodiment, only one of the bracing component and the securing component has a heater. The heaters 218, 220 can be connected to each other or can be separate, as discussed below with respect to FIGS. 12a-c. In another embodiment, the nozzle 16 and manifold 12 are unheated.

Each nozzle tip 204 has a sealing component 222 for mating with a sealing surface 224 of a gate component, such as the gate insert 51, that defines the mold gate 226. In this embodiment, the sealing component includes a circumferential sealing surface 228 for mating with the surface 224 defined by a bore in the gate insert 51. In this way, the nozzle tip 204 engages with the gate insert 51 (gate component). Further, in this embodiment, the sealing component 222 and the nozzle tip 204 are separate pieces. In other embodiments, the gate component can be a plate or other structure that defines a mold gate.

To hold the nozzle tips 204 in place, a surface 230 of the securing component 208 contacts an upstream surface 232 of each nozzle tip 204 to engage a downstream shoulder 234 of the nozzle tip 204 with a shoulder 236 of the bracing component 202, via, in this embodiment, the sealing component 222. That is, the shoulder 234 of the nozzle tip 204 contacts the sealing component 222 and presses a shoulder 238 of the sealing component 222 against the shoulder 236 of the bracing component 202. In other embodiments having other sealing component designs, the shoulder 234 of the nozzle tip 204 can directly press against the shoulder 236 of the bracing component 202.

Regarding geometry, the shoulder 234 of the nozzle tip 204, the shoulder 236 of the bracing component 202, and the shoulder 238 of the sealing component 222 are stepped shoulders. In another embodiment, the shoulders can be angled or tapered (e.g., conical). In addition, the surface 230 of the securing component 208 is an angled surface that contacts the likewise angled upstream surface 232 of the nozzle tip 204. In this embodiment, the surfaces 230, 232 are flat surfaces. In another embodiment, the surfaces 230, 232 can be tapered surfaces (e.g., conical).

Sealing against leakage of molding material is aided by the angle of the surfaces 230, 232 with respect to the direction of the fastening force provided by the bolts 212. That is, a wedging type action at the surfaces 230, 232 is translated into a thrusting type action at the shoulders 234, 236, 238, with both such actions aiding sealing. Accordingly, tightening the bolts 212 increases sealing force.

Figure 3:
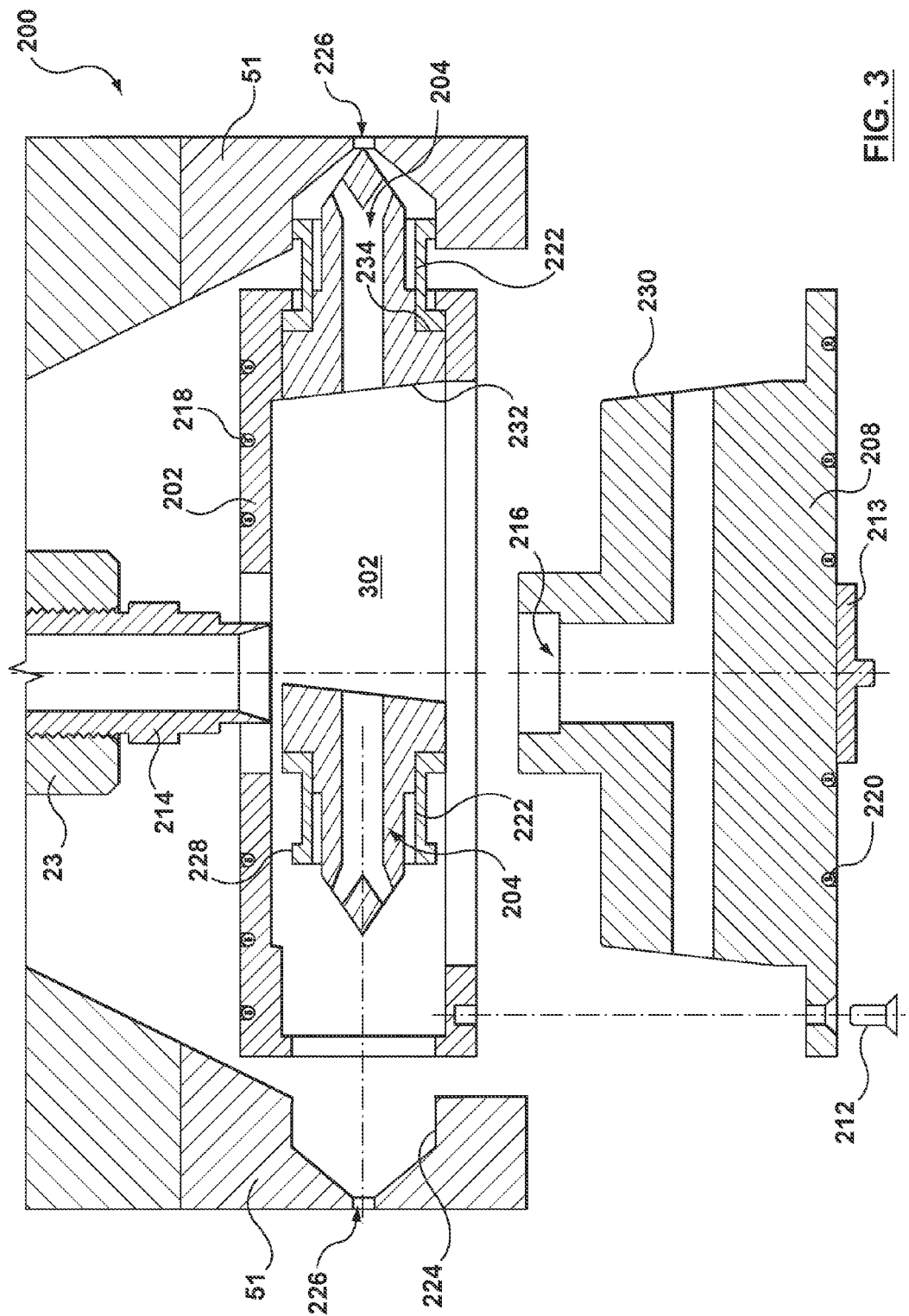
FIG. 3 is a cross-sectional view of components of the downstream nozzle portion of FIG. 2 being separated from the injection molding apparatus.

FIG. 3 shows components of the downstream nozzle portion 200 being separated from the injection molding apparatus 10.

The plate 58 (not shown) is removed, exposing and allowing access to the downstream nozzle body 200. Then, the securing component 208 is disconnected and removed from the bracing component 202, leaving an internal space 302. At the same time, the securing component 208 is withdrawn from the nozzle link 214. One or more nozzle tips 204 can then be withdrawn by first pulling them rearwardly into the space 302, and then out of the bracing component 202. As a nozzle tip 204 is removed it is slid away from the gate insert 51, such that the sealing surface 228 of the sealing component 222 disengages from the mating cylindrical sealing surface 224 defined by the gate insert 51. Alternatively, the sealing component 222 can be left engaged with the gate insert 51 if desired. Assembly of the downstream nozzle portion 200 is the same process reversed. Because of the way the securing component 208 and the bracing component 202 hold the nozzle tips 204, adding, removing, or replacing a nozzle tip 204 can be done with a reduced requirement for disassembly of the larger apparatus. The injection molding apparatus 10 does not have to be removed from the press to change a tip. In this embodiment, only partial disassembly of the mold is required, namely, the removal of the plate 58.

Figure 4:
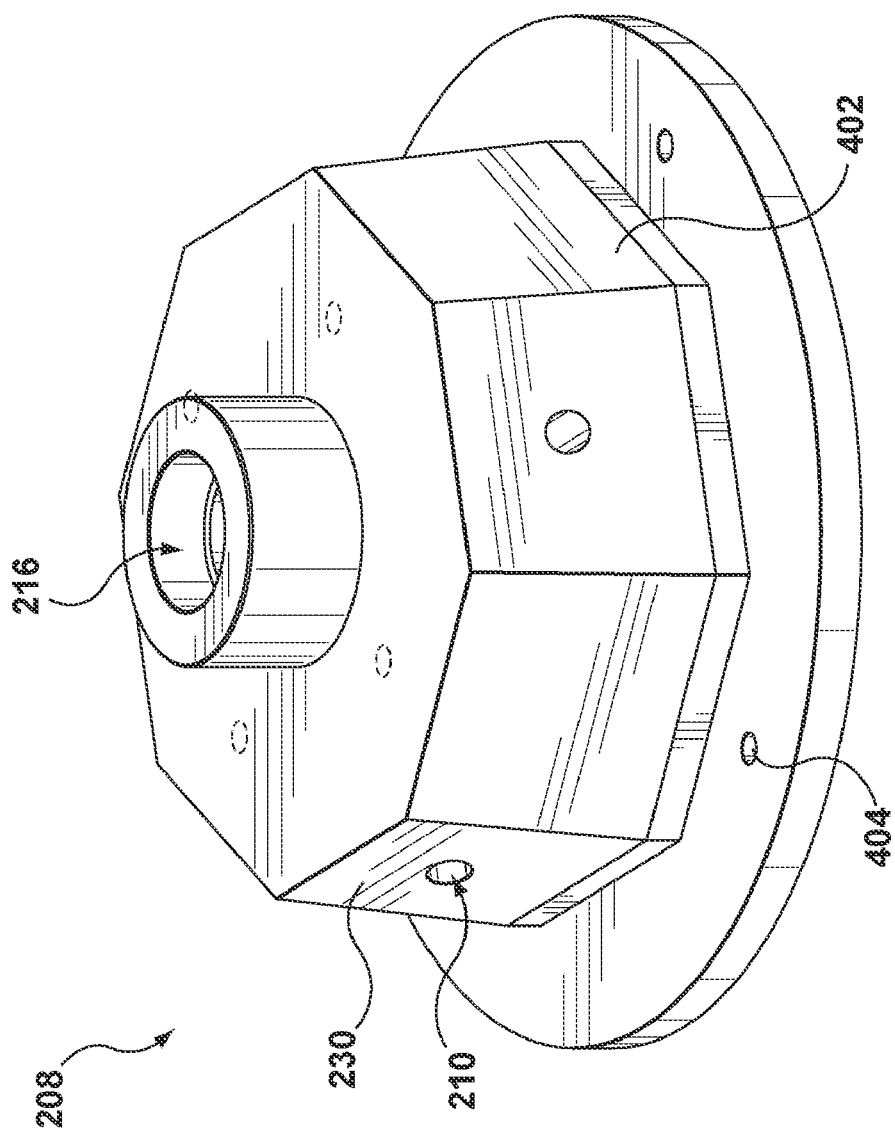
FIG. 4 is a perspective view of the securing component of FIG. 2.

FIG. 4 shows the securing component 208 in perspective. The angled flat surfaces 230 are disposed between surfaces 402, which themselves may be flat or curved and vertical or sloped. Bolt holes 404 are arranged along the perimeter for receiving the bolts 212 (FIG. 2) for connection to the bracing component 202. Alternative locations for bolt holes are illustrated with phantom lines, and further locations would also be suitable.

Figure 5:
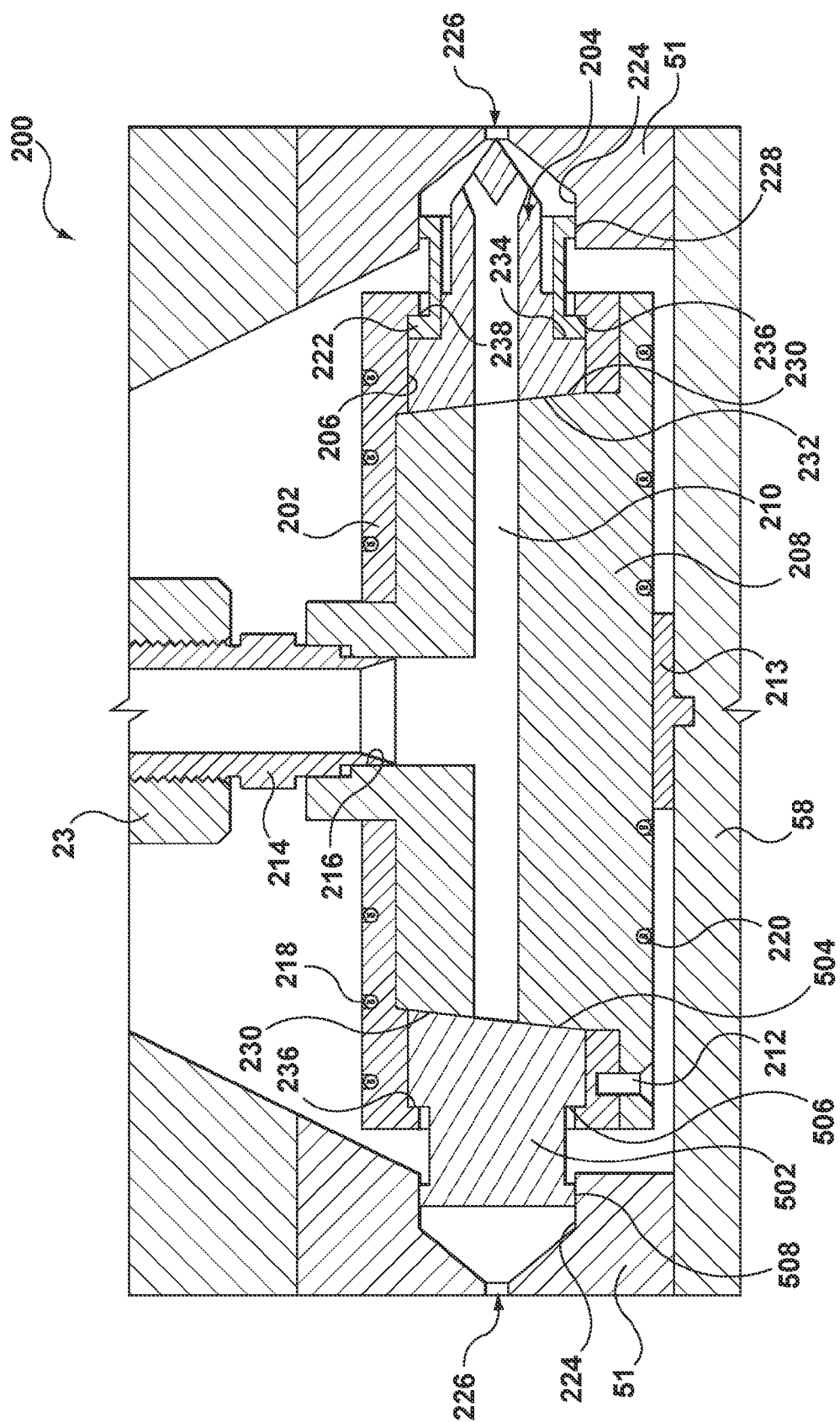
FIG. 5 is a cross-sectional view of a blind tip used in the downstream nozzle portion of FIG. 2.

FIG. 5 illustrates a blind tip 502 used in the downstream nozzle portion 200. The blind tip 502 replaces a nozzle tip 204 that is to be taken out of service for some reason (e.g., mold cavity leakage or damage, etc). The blind tip 502 includes a surface 504 for contacting the surface 230 of the securing component 208, a shoulder 506 for contacting the shoulder 236 of the bracing component 202, and a surface 508 for engaging with the surface 224 of the gate insert 51. The blind tip 502 behaves in much the same was as a nozzle tip 204, except that the blind tip 502 blocks the flow of molding material to the associated mold gate 226 and cavity.

Figure 6:
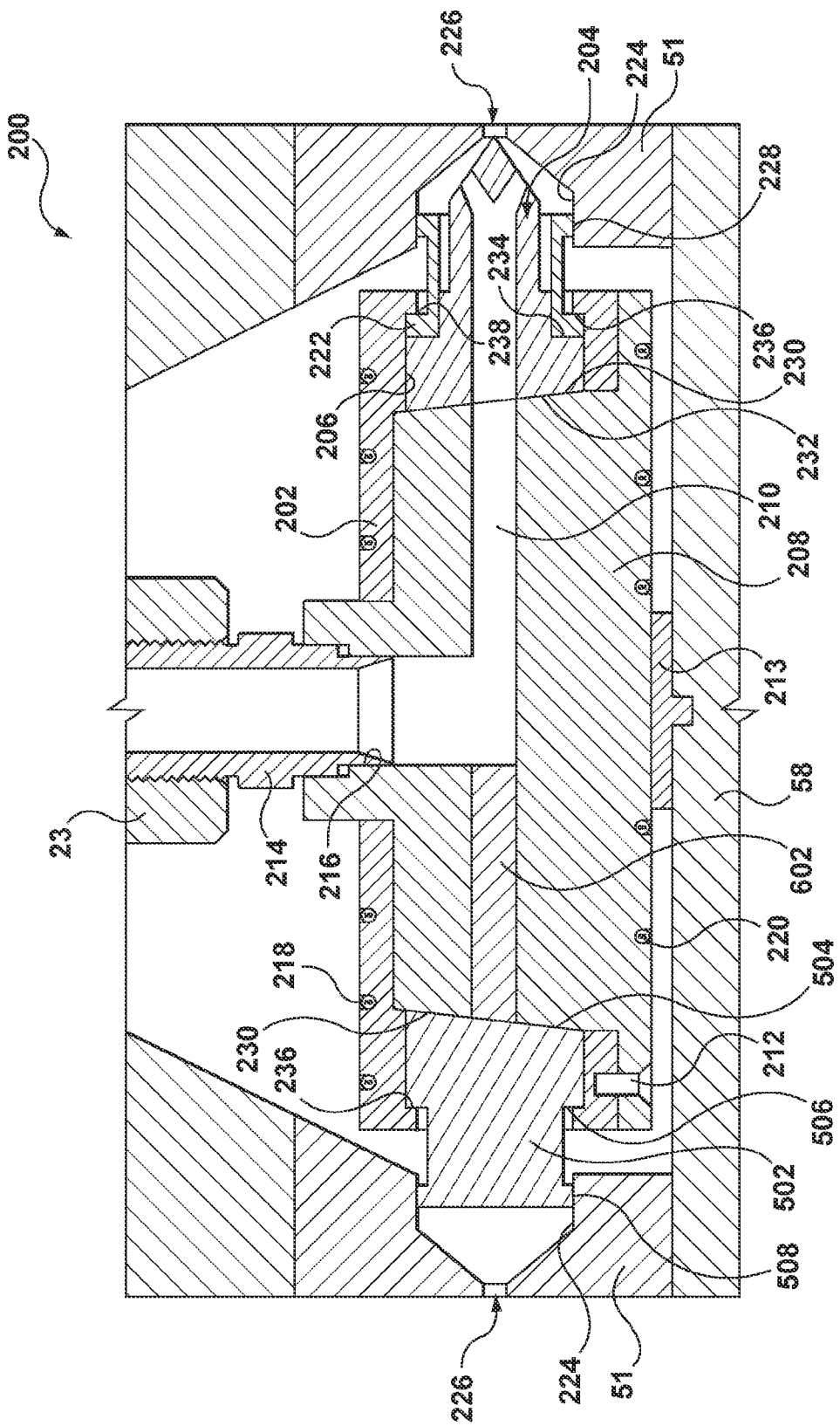
FIG. 6 is a cross-sectional view of a blind insert used in the downstream nozzle portion of FIG. 2.

FIG. 6 illustrates a blind insert 602 used in the downstream nozzle portion 200. The blind insert 602 is disposed in a lateral channel 210 that is to be taken out of service for some reason (e.g., mold cavity leakage or damage, etc). The blind insert 602 can be inserted into the securing component 208 when the securing component 208 is removed from the bracing component 202. The blind insert 602 blocks the flow of molding material to the associated mold gate 226. In this embodiment, the blind insert 602 is used in conjunction with the blind tip 502. In other embodiments, the blind insert 602 can be used with a nozzle tip 204 provided that the blind insert 602 is held in place against pressure of the molding material. There are many structures well within the skill of a designer that can achieve this.

The blind tip 502 and the blind insert 602 can be referred to generically as flow blockers. Other kinds of flow blockers can be used as well.

Figure 7:
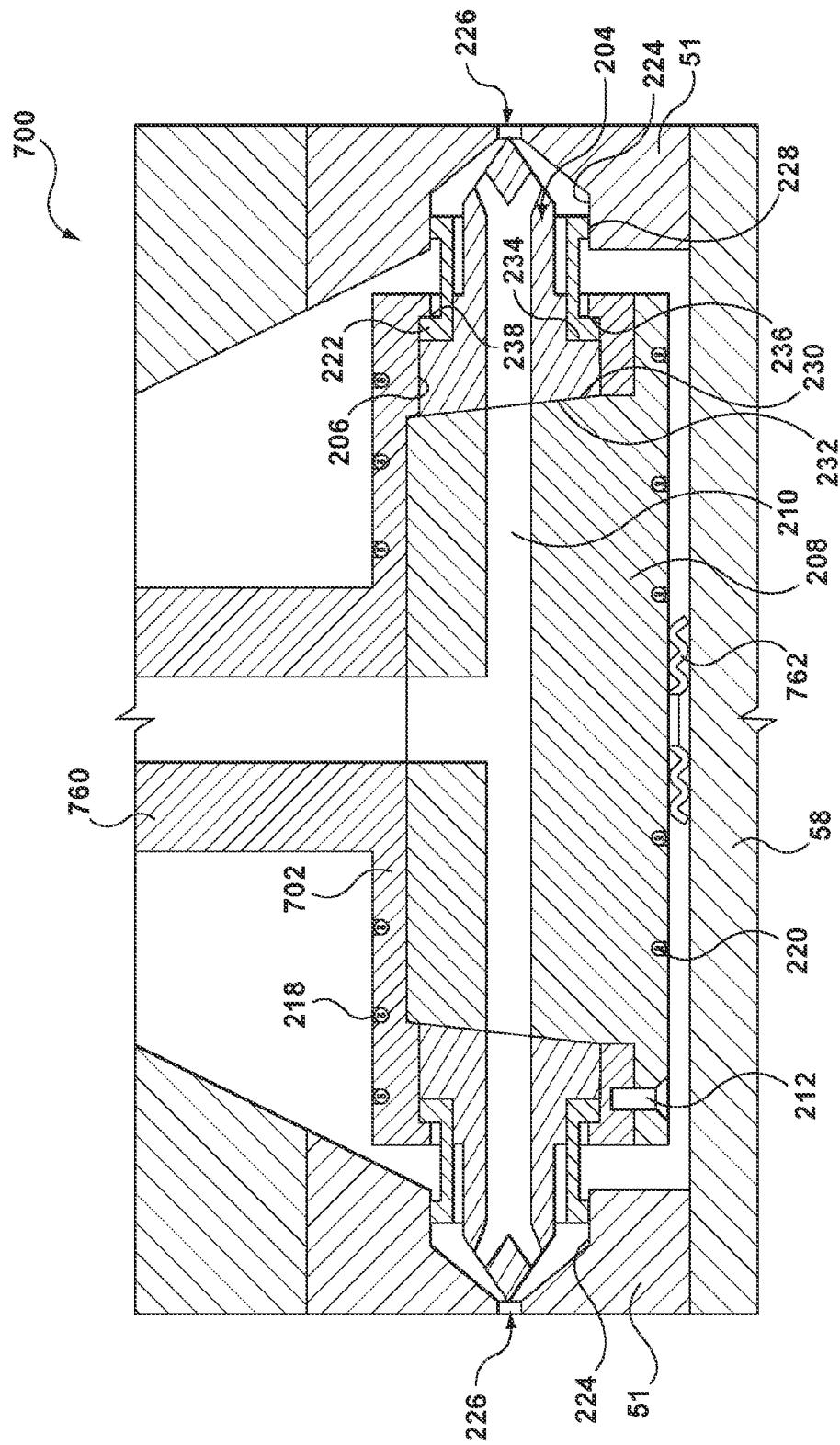
FIG. 7 is a cross-sectional view of another embodiment of a downstream nozzle portion according to the present invention.

FIG. 7 illustrates another embodiment of a downstream nozzle portion 700 according to the present invention. The features and aspects described for the other embodiments can be used accordingly with the present embodiment. Only differing features and aspects of the present embodiment are described in detail.

In this embodiment, the downstream nozzle portion 700 defines the nozzle body of the runnerless nozzle. In another embodiment, the downstream nozzle portion is connected to an upstream nozzle portion (as in FIG. 1) via a nozzle link (not shown).

The downstream nozzle portion 700 includes a neck portion 760 and a bracing portion 702 that are fixed together (welded, brazed, threaded, etc) or made from a single piece of material. The securing component 208 is connected to the bracing portion 702 as in the other embodiments. A pressure disk 762 can be provided on the downstream side of the securing component 208.

As mentioned, the neck portion 760 can define the entire nozzle body or simply a portion of a larger nozzle body.

Figure 8:
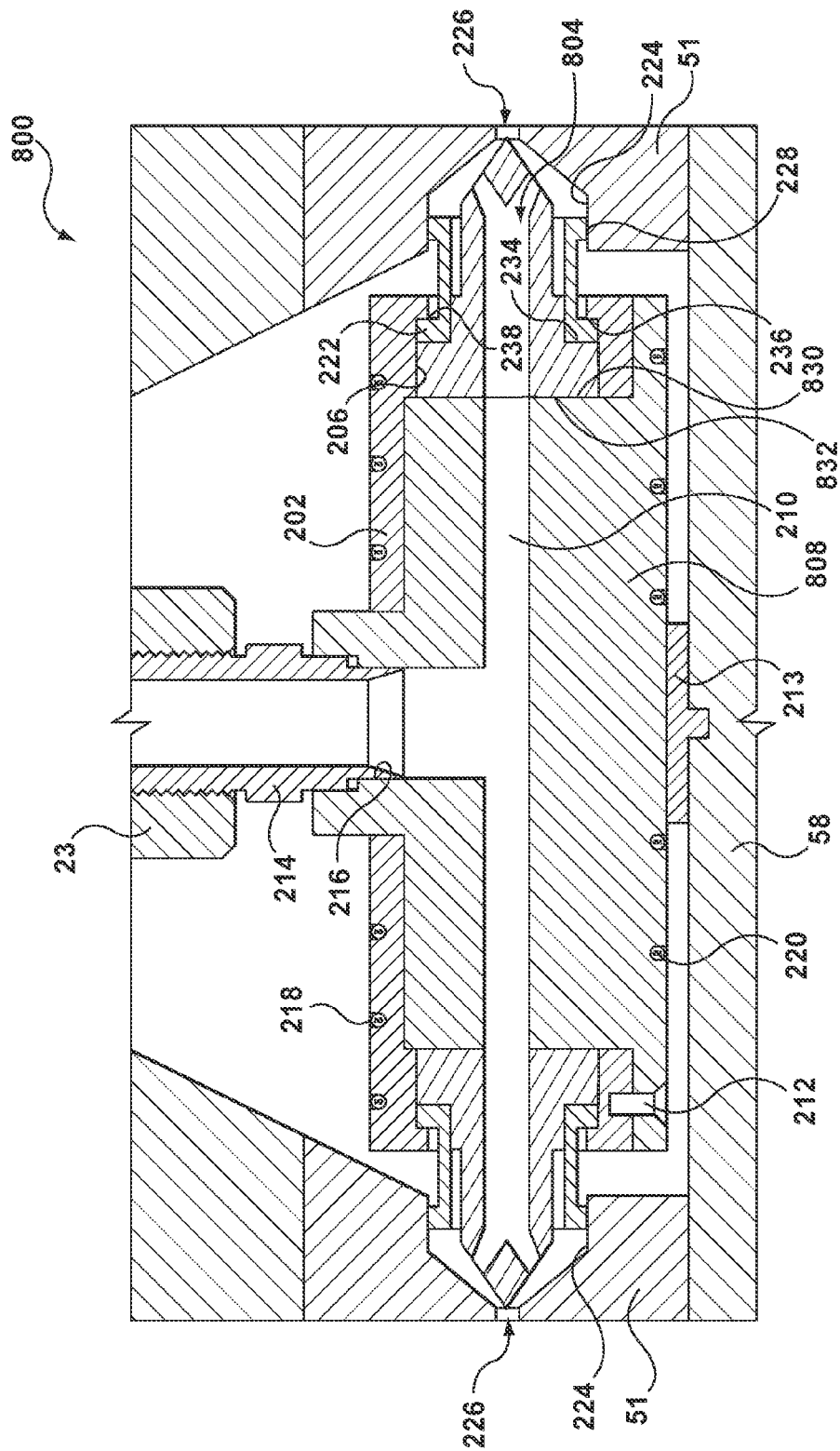
FIG. 8 is a cross-sectional view of another embodiment of a downstream nozzle portion according to the present invention.

FIG. 8 illustrates another embodiment of a downstream nozzle portion 800 according to the present invention. The features and aspects described for the other embodiments can be used accordingly with the present embodiment. Only differing features and aspects of the present embodiment are described in detail.

A downstream nozzle portion 800 has a securing component 808 that has a surface 830 contacting an upstream surface 832 of a nozzle tip 804 to hold the nozzle tip 804 in place. The surfaces 830, 832 are flat or cylindrical in shape. Sealing against leakage of molding material can be aided by differences in thermal expansion of the materials selected for the securing component 808, bracing component 202, and nozzle tips 804. For example, the securing component 808 can be made of highly thermally expansive material which expands as the downstream nozzle portion 800 is heated to thrust the nozzle tips 804 against the bracing component 202. Other material combinations would be apparent to a designer.

Figure 9:
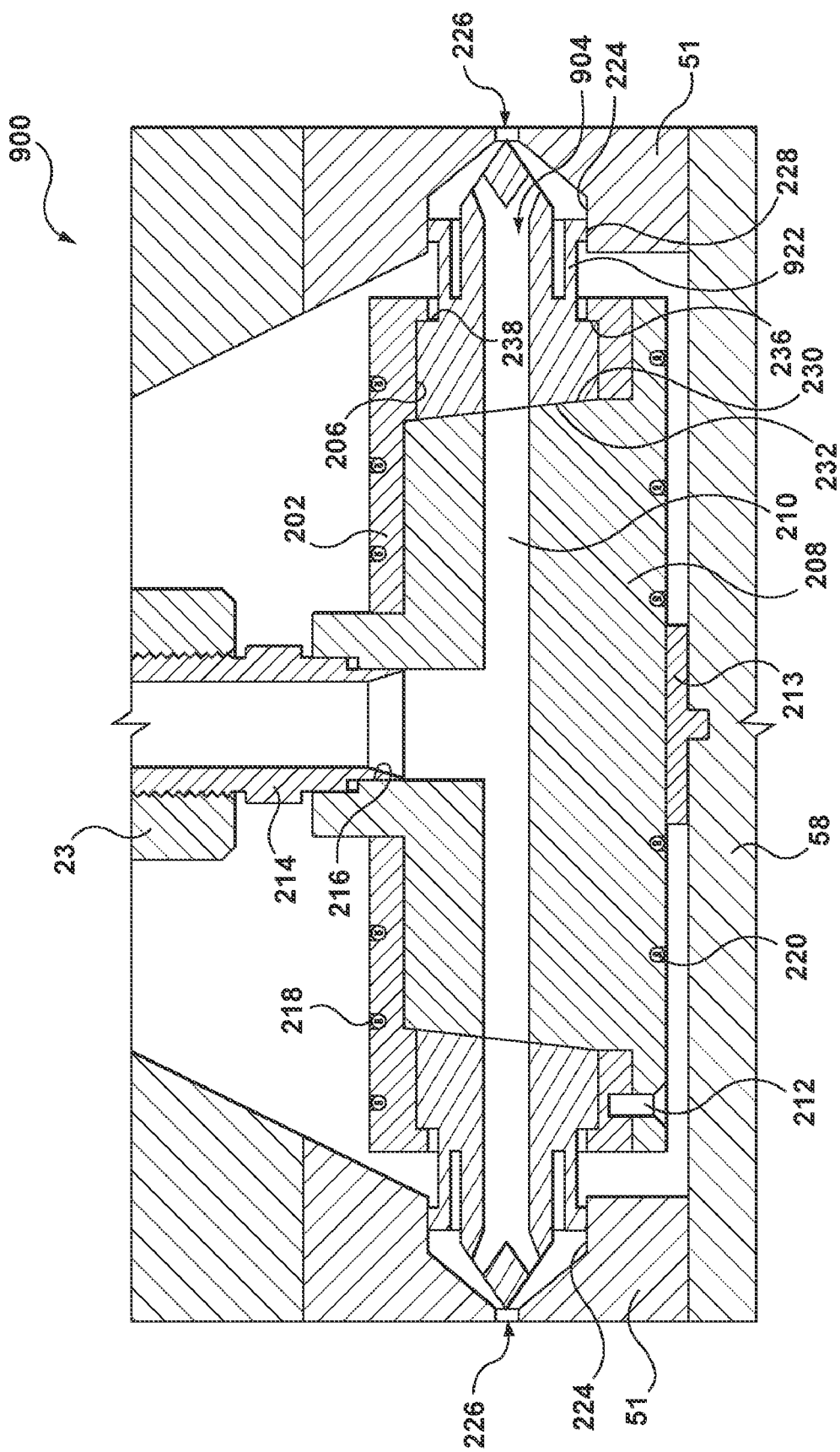
FIG. 9 is a cross-sectional view of another embodiment of a nozzle tip according to the present invention.

FIG. 9 illustrates another embodiment of a nozzle tip according to the present invention. The features and aspects described for the other embodiments can be used accordingly with the present embodiment. Only differing features and aspects of the present embodiment are described in detail.

A downstream nozzle portion 900 includes a nozzle tip 904 having an integral sealing component 922.

Figure 10:
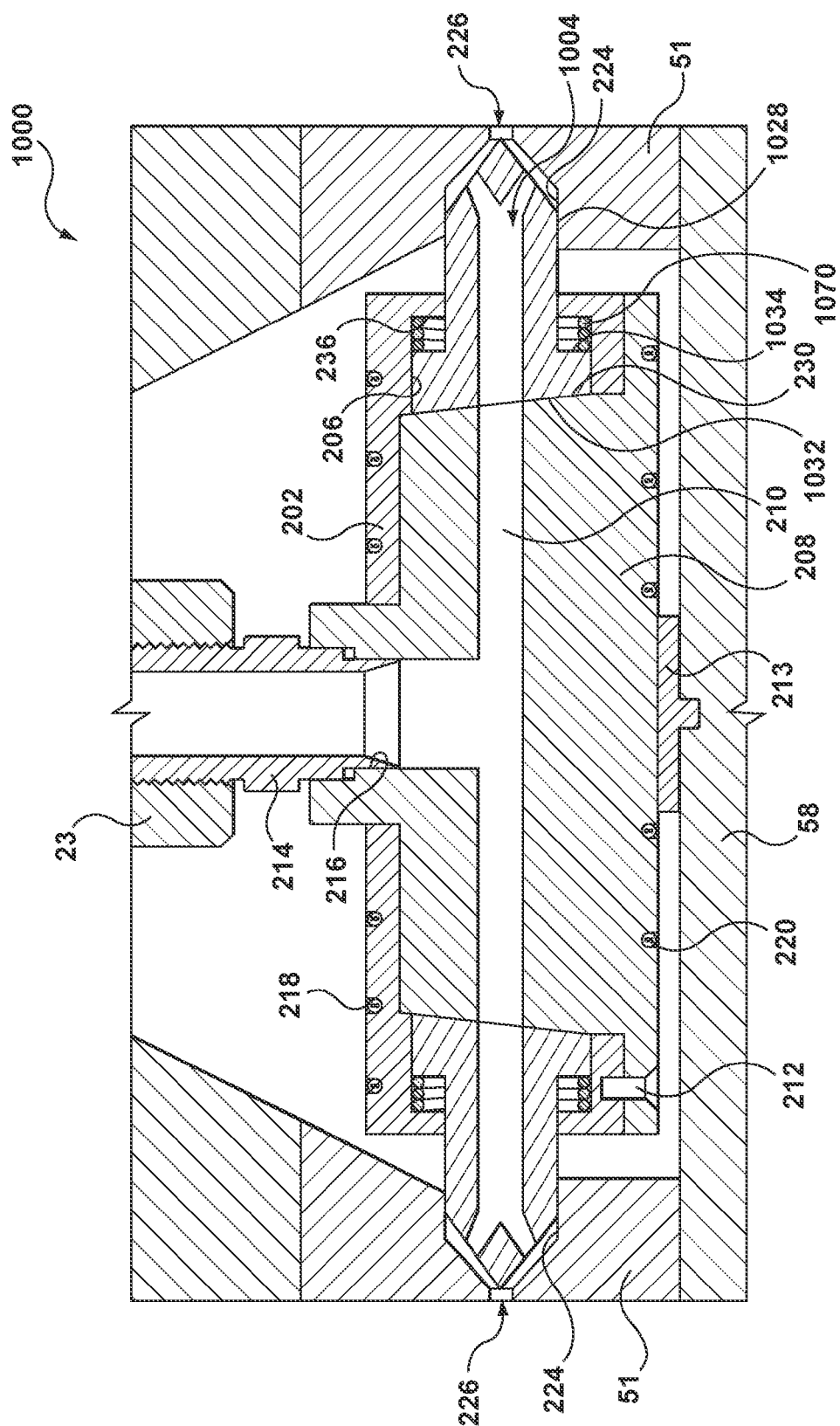
FIG. 10 is a cross-sectional view of another embodiment of a nozzle tip according to the present invention.

FIG. 10 illustrates another embodiment of a nozzle tip according to the present invention. The features and aspects described for the other embodiments can be used accordingly with the present embodiment. Only differing features and aspects of the present embodiment are described in detail.

A downstream nozzle portion 1000 includes a nozzle tip 1004 having a sealing surface 1028 for engaging with the cylindrical sealing surface 224 of the gate insert 51. As in FIG. 9, the nozzle tip 1004 has an integral sealing component for engaging with a gate component (i.e., gate insert 51).

The surface 230 of the securing component 208 contacts an upstream surface 1032 of the nozzle tip 1004 to press a downstream shoulder 1034 of the nozzle tip 1004 against a spring 1070 seated on a shoulder 236 of the bracing component 202. The spring 1070 can be a coil spring, one or more Belleville washers, or similar device.

Figure 11:
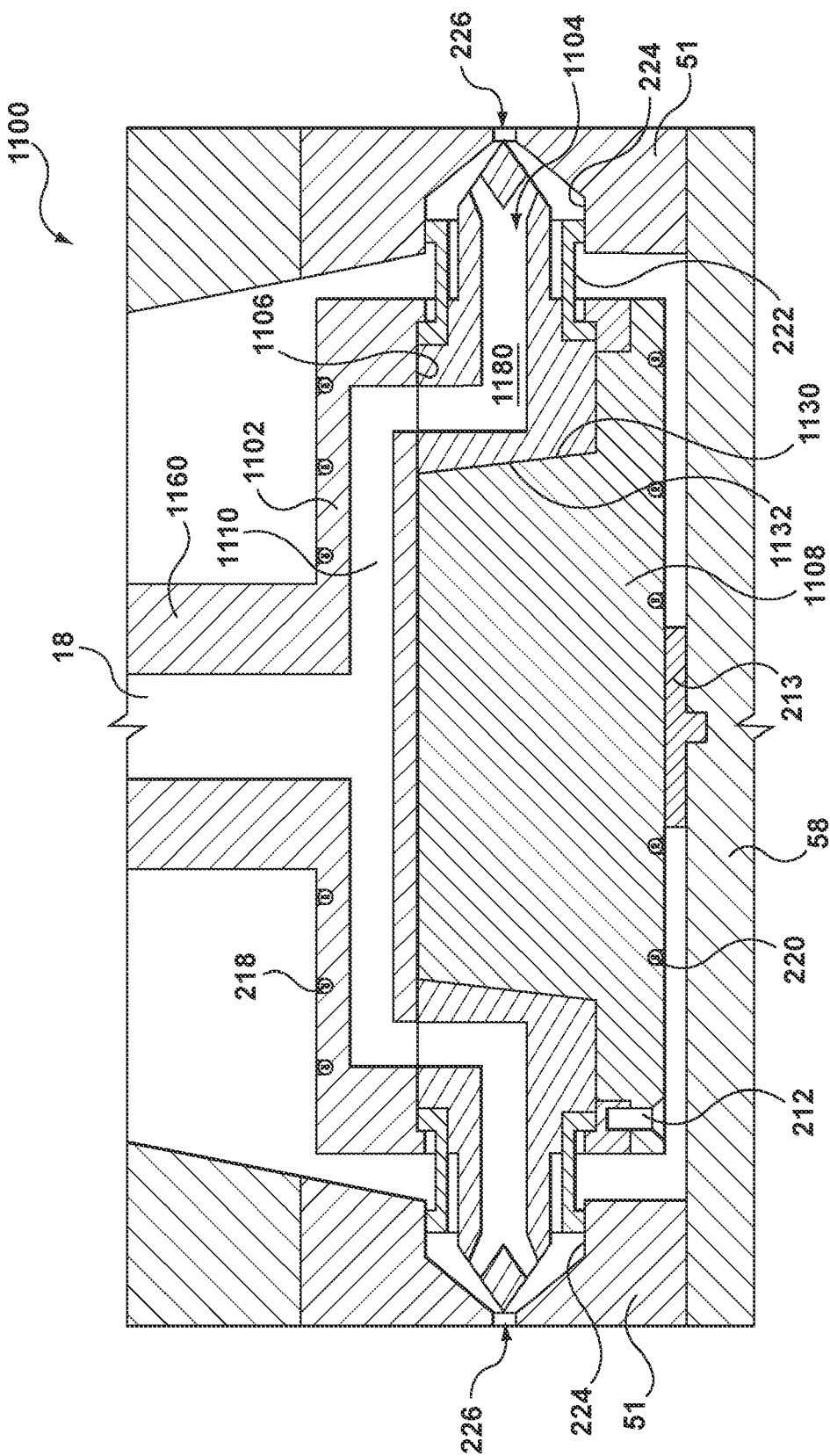
FIG. 11 is a cross-sectional view of another embodiment of a downstream nozzle portion according to the present invention.

FIG. 11 illustrates another embodiment of a downstream nozzle portion according to the present invention. The features and aspects described for the other embodiments can be used accordingly with the present embodiment. Only differing features and aspects of the present embodiment are described in detail.

A downstream nozzle portion 1100 includes a bracing portion 1102 and a neck portion 1160 fixed together or made of the same piece. The bracing portion 1102 defines lateral channels 1110 in communication with the upstream channel 18 for delivering molding material to nozzle tips 1104.

Each nozzle tip 1104 extends through a bore 1106 of the bracing portion 1102 and defines a tip channel 1180 that communicates with the lateral channel 1110. A securing component 1108 is inserted into the bracing portion 1102 and is fastened to the bracing portion 1102 to hold the nozzle tip 1104 in place via surfaces 1130, 1132.

As in the embodiment of FIG. 7, the neck portion 1160 can define the entire nozzle body or simply a portion of a larger nozzle body.

FIGS. 12A-12C show various heater configurations for nozzles of the embodiments described herein. In the other figures, the heater wire connections were omitted for clarity. The features and aspects described for the other embodiments can be used accordingly with the present embodiment. Only differing features and aspects of the present embodiment are described in detail.

In FIG. 12A, a runnerless nozzle includes a nozzle head 1202, a first terminal end 1204 extending from the nozzle head 1202, an upstream nozzle portion 1206, and a first heater wire 1208 embedded in the upstream nozzle portion 1206. First leads 1210 extend from the first terminal end 1204 to a power supply (not shown) to provide electrical power to the first heater wire 1208.

A bracing component 1212 (see FIGS. 1-11) has a second heater wire 1214 embedded therein. A second terminal end 1216 extends from the bracing component 1212, with second leads 1218 extending back to a power supply.

A securing component 1220 (see FIGS. 1-11) has a third heater wire 1222 embedded therein. A quick-connect lead 1224 connects the third heater wire 1222 with the second heater wire 1214. Accordingly, the second and third heater wires 1214, 1222 are connected in series. In another embodiment, the quick-connect lead is replaced by a continuous lead.

The bracing component 1212 and securing component 1220 engage with each other to hold the nozzle tips (not shown) as described herein. One of the bracing component 1212 and the securing component 1220 is connected to the upstream nozzle portion 1206 via a nozzle link 1226.

In the embodiment of FIG. 12B, the securing component 1220 has a third terminal end 1228 for connecting the third heater wire 1222 to third leads 1230 that extend back to a power supply. Unlike the embodiments of FIGS. 12A and 12C, the second and third heater wires 1214, 1222 are not connected in series.

In the embodiment of FIG. 12C, the second heater wire 1214 of the bracing component 1212 is connected to the first heater wire 1208 of the upstream nozzle portion 1206 via a quick-connect lead 1232. In another embodiment, a quick-connect lead is replaced by a continuous lead. Unlike the embodiments of FIGS. 12A and 12B, the first and second heater wires 1208, 1214 are connected in series.

FIGS. 12A-12C show different ways that one, two, or three terminal ends can be used to connect the three heaters of the nozzle to one or more power supplies. These embodiments can be simplified if one or more of the heaters are omitted, as may be the case. FIGS. 12A-12C also apply to embodiments, such as those of FIGS. 7 and 11, where the bracing component and upstream nozzle portion are integral. In addition, while embedded resistance heater wires are shown by way of example, other kinds of heaters can be used instead.

Although many embodiments of the present invention have been described, those of skill in the art will appreciate that other variations and modifications may be made without departing from the spirit and scope thereof as defined by the appended claims. All patents and publications discussed herein are incorporated in their entirety by reference thereto.

What is claimed is:

1. A runnerless nozzle comprising:
    a nozzle body defining an upstream channel;
    a downstream bracing component having a lateral bore;
    a nozzle tip extending laterally through the lateral bore of the bracing component; and
    a securing component separate from the nozzle body and insertable into the bracing component to hold the nozzle tip against the bracing component,
    wherein at least one of the bracing component and the securing component defines a lateral channel in communication with the upstream channel for delivering molding material to the nozzle tip, and
    wherein the bracing component and the securing component are made from materials having different thermal expansion characteristics.

2. The runnerless nozzle according to claim 1, wherein the securing component is made from a material which is more thermally expansive than the bracing component.

3. The runnerless nozzle according to claim 2, further comprising a sealing component extending laterally through the lateral bore of the bracing component, the sealing component having a sealing surface for engaging a gate component that defines a mold gate.

4. The runnerless nozzle according to claim 3, wherein the nozzle tip and the sealing component each has a shoulder and the nozzle tip shoulder presses the sealing component shoulder against the bracing component when the securing component is disposed in the internal space of the bracing component.

5. The runnerless nozzle according to claim 3, wherein the nozzle tip shoulder and the sealing component shoulder are stepped shoulders.

6. The runnerless nozzle according to claim 3, wherein the nozzle tip shoulder and the sealing component shoulder are tapered shoulders.

7. The runnerless nozzle according to claim 3, wherein the nozzle tip and the sealing component are separate pieces.

8. The runnerless nozzle according to claim 3, wherein the nozzle tip and the sealing component are integral.

9. The runnerless nozzle according to claim 2, wherein the securing component has an outside surface which contacts an upstream surface of the nozzle tip to engage a downstream shoulder of the nozzle tip with a shoulder of the bracing component when the securing component is disposed in the internal space.

10. The runnerless nozzle according to claim 9, wherein the outside surface of the securing component and the upstream surface of the nozzle tip are angled.

11. The runnerless nozzle according to claim 1, wherein the nozzle tip is made from a material having different thermal expansion characteristics than the securing component and the bracing component.

12. The runnerless nozzle according to claim 1, wherein the securing component is connected to the bracing component by a fastener.

13. The runnerless nozzle according to claim 1, wherein the bracing component includes a plurality of lateral bores radially spaced evenly around the bracing component, and wherein the nozzle tip comprises a plurality of nozzle tips, each of the nozzle tips extending outwardly through a corresponding one of the lateral bores.

14. The runnerless nozzle according to claim 1, wherein at least one of the bracing component and securing component is slidably coupled to the nozzle body.

15. The runnerless nozzle according to claim 14, wherein a portion of the securing component extends through the bracing component and is slidably coupled to the nozzle body.

16. The runnerless nozzle according to claim 1, wherein the bracing component is integral with the nozzle body.

17. The runnerless nozzle according to claim 1, wherein at least one of the bracing component and the securing component has a heater.

* * * * *